United States Patent Office 3,322,488
Patented May 30, 1967

3,322,488
SULFOMETHYLATED BISPHENOL-FORMALDE-
HYDE CONDENSATION PRODUCTS USED AS
DYE RESISTS FOR POLYURETHANE AND
SYNTHETIC POLYAMIDE FIBERS
James F. Feeman, Wyomissing, Pa., assignor to Cromp-
ton & Knowles Corporation, Worcester, Mass., a corpo-
ration of Massachusetts
No Drawing. Filed Jan. 6, 1966, Ser. No. 518,975
6 Claims. (Cl. 8—115.5)

This application is a continuation-in-part of my application Ser. No. 194,993 filed May 15, 1962, which related to certain new sulfomethylated condensation products of bisphenols and aldehydes. The application was also directed to the production of such condensation products and to their use as agents.

I have now discovered that the sulfomethylated condensation products disclosed and claimed in the aforesaid application are excellent reserving agents for synthetic polyamide and polyurethane fibers.

According to application Ser. No. 194,993, the new and useful composition is a water soluble condensation product having the probable structure:

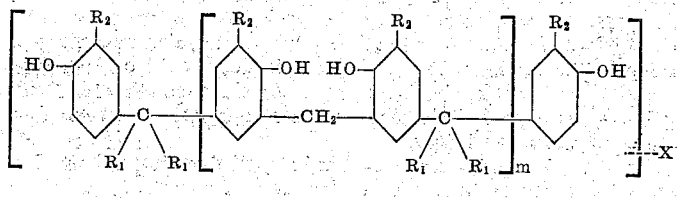

wherein $R_1$ represents the same or different low molecular weight alkyl groups (e.g., those having from one to four carbons), $R_2$ represents the same or different substituents selected from the group —H and —$CH_3$, $m$ is an integer from 1 to 6, and X represents the substitution of an average of from 1 to 2 sulfomethyl groups for each four benzene nuclei in the total structure. Where alicyclic ketones such as cyclohexanone are employed in forming the precursors of these condensation products, the $R_1$ groups in the

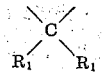

portion will be linked.

Condensation products having this structure are prepared by a new process which involves condensing two moles of a bis-phenol (compounds produced by reacting a monohydric phenol which is unsubstituted in at least two of the ortho and para positions with an aliphatic or alicyclic ketone under acid conditions) with from about 1.0 to 1.8 moles of formaldehyde in alkaline solution, making the reaction mass strongly acid and heating to complete the condensation to a water insoluble resinous material, redissolving the resin by addition of alkali, and treating the solution with from about 1 to about 4 moles of formaldehyde-bisulfite adduct in order to introduce sufficient sulfomethyl groups to impart water solubility to the product.

The process used to produce the condensation products of this invention is thought to proceed by the following steps illustrated for a ratio of 2 moles of Bis-Phenol A (the condensation product of two moles of phenol with one mole of acetone under acidic conditions) with one mole of formaldehyde:

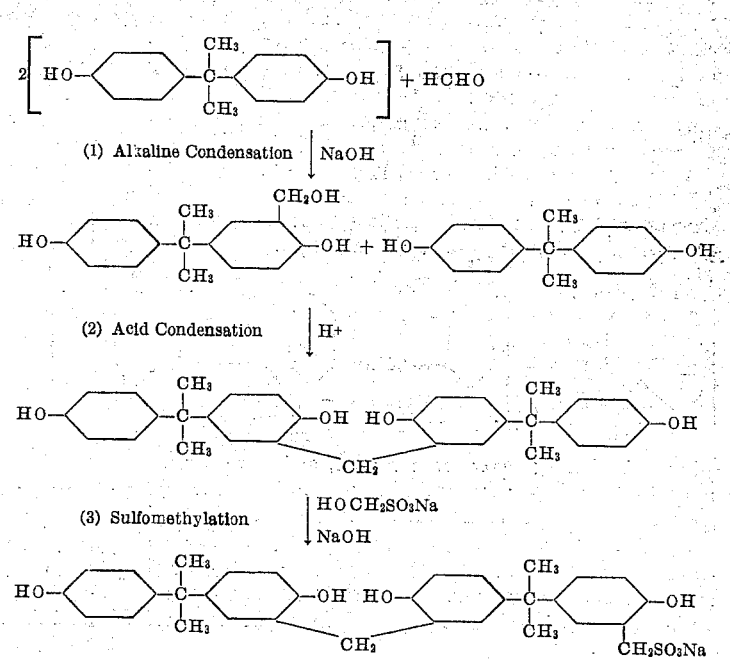

An essential feature of this new process involves completely dissolving the bis-phenol compound in aqueous alkali (e.g., aqueous sodium hydroxide solution) before the addition of the formaldehyde. This assures uniformity of degree of polymerization of the final product by giving an even distribution of methylol groups in the available reactive ortho-phenolic positions. Upon acidification of the methylolated bis-phenol, methylene groups are formed between different bis-phenol molecules thereby producing condensation products of relatively low degree of polymerization, i.e., having from two to about seven bis-phenol units of structure in each chain. The number of bis-phenol units present will depend on the amounts of formaldehyde and bis-phenol units employed in the reaction mixture.

Where more than one mole of formaldehyde is employed in the alkaline condensation step, additional methylol groups will be introduced in the bis-phenol and thereby provide additional cross-linkable groups enabling condensation products of greater molecular weight to be formed.

The use of lower amounts of formaldehyde per bis-phenol unit (i.e., those nearer the 1:2 ratio) is preferred, since the polymeric water-insoluble resin formed in the alkaline and acid condensation is less viscous, more readily handled in manufacture, and is redissolved more easily before sulfomethylation. Desired reserving properties of the condensation products produced with the lower amounts of formaldehyde are equal to and in some cases superior to those of condensation products having a higher degree of polymerization.

Preferably, the product of the acid condensation should be completely redissolved before addition of the formaldehyde-bisulfite adduct—this assures uniformity and proper solubility of the final product, by providing even distribution of solubilizing sulfomethyl groups among and along the polymeric chains. Thus good solubility is achieved with a minimum number of sulfomethyl groups thereby assuring maximum effectiveness of the product.

It is preferred to employ sufficient formaldehyde-bisulfite adduct in the sulfomethylation step to assure reasonable solubility of the final product in cold water at customary dyeing liquor ratios. This level of sulfomethylation is achieved by use of from 1 to 4 moles of adduct for each two moles of original bis-phenol compound. In such cases, all of the adduct does not react, the amount entering into combination will depend on temperature and time of reaction as well as upon the amount of adduct initially present in the reaction mixture. Where the product of the acid condensation is polymerized to a degree that the polymer includes from 2 to 7 bis-phenol units, it is preferred to employ sufficient formaldehyde-bisulfite adduct to introduce an average of from 1 to 2 sulfomethyl groups for each four benzene nuclei in the polymer. Excessive sulfomethylation reduces the effectiveness of the resist action of the resins.

Where 2 moles of bis-phenol A are condensed as described above with 1 to 1.8 moles of formaldehyde and thereafter sulfomethylated, the resultant condensation products are believed to have the structure:

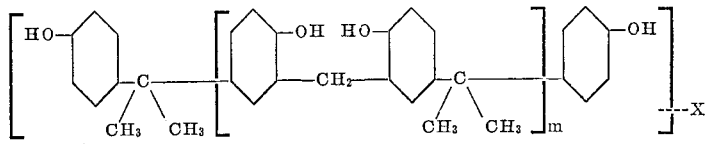

wherein $m$ is an integer from 1 to 6, and X represents the substitution of an average of from 1 to 2 sulfomethyl groups for each four benzene nuclei in the total structure.

Suitable bis-phenols may be produced by acidic condensation of phenol or o-cresol with acetone, methyl ethyl ketone, cyclohexanone and similar low molecular weight ketones. Mixed bis-phenols prepared from phenol-cresol mixtures may also be used as well as mixtures of homogeneous bis-phenols.

The water soluble resinous condensation products produced according to this disclosure are, when isolated and dried, essentially colorless solids which have good thermal and light stability, i.e., do not yellow or otherwise discolor noticeably.

I have now discovered that the condensation products described above are resists or reserving agents (i.e., substances which repel or resist dyes and prevent their fixation on material) for synthetic polyamide fibers such as the various nylons (6, 66, 8, 11) in their various fibrous forms and for synthetic polyurethane fibers such as the spandexes.

In cases where textiles formed of two or more fibers, at least one of which is a synthetic polyamide or polyurethane, and the other fiber or fibers are cellulosic (cotton, jute, linen, regenerated cellulose, and the like), are subjected to conventional dyeing operations with direct dyes, the polyamide or polyurethane component can be reserved by carrying out the dyeing operation in the presence of the water soluble sulfomethylated condensation products described and claimed in application No. 194,993.

In other cases where textiles formed of two or more fibers, at least one of which is a synthetic polyamide or polyurethane, and the other fiber or fibers are natural polyamide fibers such as animal hair fibers (e.g., wool) or silk, are subjected to conventional dyeing operations with acid type dyes, the polyamide or polyurethane fiber component can be partially or entirely reserved with the aforesaid condensation products described and claimed in application No. 194,993. Such partial reservation is of value in obtaining uniform, "union" dyeings in such cases, or, e.g., in retarding the dyeing of the synthetic component, in order to allow subsequent dyeing operations to be accomplished on the fabric that would otherwise be impossible, since in many cases, the synthetic fiber tends to absorb dye from solution at a greater rate than does the natural fiber.

The reserving agent can be applied to the textile undergoing treatment in a separate wet processing operation before dyeing or it can be applied simultaneously with the dye, i.e., in the dye bath. Applying from about ¼% to about 4% of the condensation product based on the weight of the textile undergoing treatment will usually serve to provide a suitable concentration of the resist to prevent the polyamide or polyurethane fibers of a mixed fiber textile from being dyed to a significant degree and for most purposes, the use of about 1% of the reserving agent will provide an adequate resist.

Further, the presence of the resist on the fiber does not interfere significantly with afterdyeing of the polyamide or polyurethane component with conventional acid or neutral dyeing dyes.

The following examples will serve to illustrate the invention and in these examples, unless otherwise stated, the parts are expressed as parts by weight and temperatures are expressed on the centigrade scale:

*Example 1*

Bis-phenol A (2,2-bis-(p-hydroxyphenyl)-propane) (456 parts, 2 moles) and 80 parts of sodium hydroxide were dissolved in 1000 parts of water at 60°, and 81 parts (1 mole) of 37% formaldehyde solution was added with continuous stirring. The temperature was raised to 90°, held there two hours, and then concentrated hydrochloric acid (265 parts) was added. The mixture separated into two phases, and with continued stirring, the mixture was heated for three hours at 95°. The pH was 1 to 1.5 during this time. The viscous organic layer was then redissolved completely by the cautious addition of sodium hydroxide (160 parts) as 50% solution. When solution was complete, a solution of formaldehyde-sodium bisulfite adduct (previously prepared from 162 parts (2 moles) of 37% formaldehyde solution, 165 parts of water, and 200 parts of sodium metabisulfite) was added, and the solution was stirred and heated for 18 hours at 95° C. After cooling, the pH of the resultant clear solution was adjusted to 6.0 by addition of 420 parts of concentrated hydrochloric acid, 200 parts of sodium chloride was added, and the precipitated solid was filtered and dried, giving 710 parts of colorless solid which is readily soluble in cold water to yield a clear solution.

Table I, which follows, lists Examples 2 to 21 wherein are shown additional representative methods of proceeding to yield products of the disclosed type, all having properties which make them useful for the purposes previously described in this disclosure. Additional variations in ratios of reactants will be obvious to those skilled in the art, and these examples are intended to be only representative rather than all-inclusive.

TABLE I

| Ex. No. | Bis-Phenol A used (moles) | Formaldehyde used (moles) | NaOH used for resolution (parts) | Formaldehyde Bisulfite adduct used (moles) |
|---|---|---|---|---|
| 2 | 0.5 | 0.25 | 30 | 0.25 |
| 3 | 0.5 | 0.25 | 30 | 0.30 |
| 4 | 0.5 | 0.25 | 35 | 0.35 |
| 5 | 0.5 | 0.25 | 40 | 0.40 |
| 6 | 0.5 | 0.25 | 40 | 0.50 |
| 7 | 0.5 | 0.25 | 40 | 0.60 |
| 8 | 0.5 | 0.25 | 40 | 0.70 |
| 9 | 0.5 | 0.25 | 40 | 0.80 |
| 10 | 0.5 | 0.265 | 40 | 0.50 |
| 11 | 0.5 | 0.284 | 40 | 0.50 |
| 12 | 0.5 | 0.309 | 40 | 0.50 |
| 13 | 0.5 | 0.333 | 28 | 0.25 |
| 14 | 0.5 | 0.333 | 32.5 | 0.30 |
| 15 | 0.5 | 0.333 | 37.5 | 0.40 |
| 16 | 0.5 | 0.333 | 40 | 0.50 |
| 17 | 0.5 | 0.40 | 40 | 0.30 |
| 18 | 0.5 | 0.40 | 40 | 0.50 |
| 19 | 0.5 | 0.40 | 40 | 0.80 |
| 20 | 0.5 | 0.415 | 40 | 0.50 |
| 21 | 0.5 | 0.415 | 40 | 0.75 |

In each of the above examples (2 to 21 inclusive) the procedure of Example 1 was followed, in each case employing 250 parts of water and 20 parts of sodium hydroxide for the initial solution. After methylolation 65 parts of concentrated aq. hydrochloric acid was added and the mixture heated as in Example 1. The NaOH used for redissolving the polymer was added as 50% solution, and following completion of solution of the polymer, the $HOCH_2$—$SO_2Na$ was added as solution in water. The final solution, after heating 18 hours or longer, was cooled, neutralized, salted, if desired to precipitate the product before drying, and dried conventionally or spray dried.

*Example 22*

2,2-bis-(4-hydroxy-3-methylphenyl)-propane (102.4 parts, 0.4 mole) (prepared by condensation of o-cresol with acetone under acidic conditions) was dissolved at 70° in 250 parts of water containing 32 parts of sodium hydroxide. To this solution was added with continuous stirring 16.2 parts of 37% fomaldehyde solution, and the temperature was held at 80° for three hours. Then 125 parts of concentrated aqueous hydrochloric acid was added and the temperature held at 95° for two hours. The viscous precipitated resin was then redissolved by addition of 40 parts of sodium hydroxide as 50% solution. After all was in solution, a solution of 0.4 mole of formaldehyde-bisulfite adduct (prepared from 32.4 parts of 37% formaldehyde solution, 40 parts of water and 40 parts of sodium metabisulfite) was added. Following an 18 hour period of heating and stirring at 95°, the resultant solution was cooled, adjusted to pH 6 with hydrochloric acid, salted with 30 parts of sodium chloride, filtered and dried giving 157 parts of a colorless water-soluble powder.

*Example 23*

1,1-bis-(4-hydroxyphenyl)-cyclohexane (80.4 parts, 0.3 mole) (prepared by acid condensation of cyclohexanone with phenol) was dissolved at 90° in 200 parts of water containing 24 parts of sodium hydroxide. To this solution was added with continuous stirring 12.2 parts of 37% formaldehyde solution, and the temperature was maintained at 90° for three hours. Then 75 parts of concentrated hydrochloric acid was added and the temperature was kept at 90° for three hours.

A 50% aqueous solution of 40 parts of sodium hydroxide was added, and the mixture was heated and stirred until the precipitate had dissolved. A solution of 30 parts of sodium bisulfite and 24.3 parts of 37% formaldehyde in 30 parts of water was added. The reaction mixture was heated for 18 hours at 90°, with constant agitation. The product was precipitated by adjusting the pH to 6, separated, and dried, giving 123 parts of colorless solid which has the property of reserving synthetic polyamide fibers while permitting wool and cotton to be dyed when it is added to a dye bath in which a mixed fabric is entered.

*Example 24*

In Example 1, while otherwise proceeding as described, if the 456 parts of the Bis-phenol A was replaced with 484 parts of 2,2-bis-(p-hydroxy phenyl)-butane, a water soluble colorless solid was obtained having properties similar to those of the product of Example 1.

*Example 25*

Skeins consisting of five parts of spun nylon 66 and five parts of cotton were moved for fifteen minutes at 55° in a bath prepared from 250 parts of water and 0.1 part of the product of Example 1. A solution of 0.1 part of C.I. Direct Red 83 in 50 parts of water was added and the bath heated to 100° in 30 minutes. Two parts of sodium chloride was added and dyeing continued for two hours at 100°. The skeins were rinsed in water and dried. The cotton was dyed bluish-red, while the nylon was reserved and was nearly colorless.

*Example 26*

Skeins consisting of five parts of nylon 66 and five parts of cotton were moved in a bath prepared from 300 parts of water, 0.1 part of the product of Example 1, and 0.1 part of C.I. Direct Red 83. The temperature was raised in 45 minutes to 100°. Two parts of sodium chloride was added, and dyeing was continued for two hours at 100°. The skeins were rinsed and dried, and were similar in appearance to those obtained in Example 25.

*Example 27*

In Example 25, while otherwise proceeding as described, the 0.1 part of the product of Example 1 was decreased to 0.025 part of the product of Example 1, giving a similar dyeing on the cotton, and resulting in a very slight pink stain on the nylon.

*Example 28*

In Example 25, while otherwise proceeding as described, the 0.1 part of the product of Example 1 was increased to 0.2 part of the product of Example 1. The cotton was dyed as in Example 25, and the nylon remained undyed, and slightly whiter than that of Example 25.

*Example 29*

In Example 25, while otherwise proceeding as described, the 0.1 part of C.I. Direct Red 83 was replaced with 0.1 part of C.I. Direct Red 79. The cotton was dyed red and the nylon was reserved and remained nearly white.

Example 30

Fabric consisting of 7.3 parts of nylon 66, 1.3 parts of spandex (polyurethane fiber) and 1.4 parts of viscose rayon was moved for fifteen minutes at 55° in a bath prepared from 200 parts of water and 0.2 parts of the product of Example 1. A solution of 0.1 part of C.I. Direct Red 79 in 50 parts of water was added and the temperature was raised in thirty minutes to 100°. Two parts of sodium chloride was then added and dyeing was continued for two hours at 100°. The nylon and spandex remained undyed while the rayon was dyed red.

Example 31

Skeins consisting of five parts of wool and five parts of spun nylon were moved at 55° for fifteen minutes in a bath prepared from 0.2 part of the product of Example 1, 0.2 part of acetic acid and 200 parts of water. A solution of 0.1 part of C.I. Acid Blue 45 in 50 parts of water was added. The temperature was raised to 100° in thirty minutes and dyeing was continued for thirty minutes at 100°. The wool and nylon were dyed to a uniform depth of shade. A control dyeing with no product of Example 1 present gave a dyeing in which the nylon was dyed much more heavily than the wool.

Example 32

Six parts of upholstering fabric consisting of Antron nylon face (trilobal nylon 66—a product of E.I. du Pont de Nemours and Co., Inc.) with cotton and latex backing was moved for fifteen minutes at 55° in a bath prepared from 0.1 part of the product of Example 1 and 200 parts of water. A solution of 0.1 part of C.I. Direct Blue 80 in 50 parts of water was added and the bath was heated to 100° in thirty minutes. After the addition of 1.2 parts of sodium chloride, dyeing was continued two hours. The fabric was rinsed and dried. The cotton backing was dyed blue, but the Antron nylon remained undyed.

Example 33

In Example 32, while otherwise proceeding as described, the 0.1 part of C.I. Direct Blue 80 was replaced by 0.1 part of C.I. Direct Red 83. The cotton backing dyed bluish-red, while the Antron nylon face was reserved.

Example 34

Ten parts of carpet material consisting of about seven parts of nylon 6 face with three parts of jute backing was moved for fifteen minutes at 55° in a solution of 0.1 part of the product of Example 1 in 150 parts of water. A solution of 0.1 part of C.I. Direct Blue 100 was added and the bath heated to 100° in thirty minutes. Two parts of sodium chloride was added and dyeing continued for one hour. The nylon 6 was reserved while the jute backing was dyed dark blue. A solution of 0.1 part of C.I. Acid Blue 45 in 50 parts of water was added. Then four parts of five percent acetic acid was added, and dyeing was continued for one hour. The fabric was rinsed and dried. The nylon 6 face was dyed a bright blue shade.

Example 35

Ten parts of automative carpet fabric consisting of about three parts of jute backing, four and one-half parts of viscose rayon and two and one-half parts of nylon 66 was placed in a bath prepared from 0.1 part of the product of Example 1, and 200 parts of water, and agitated at 55° for fifteen minutes. A solution of 0.1 part of C.I Direct Blue 80 in 50 parts of water was added, and the bath was heated to 100° in thirty minutes. Two parts of sodium chloride was added and dyeing was continued for two hours. The jute and rayon were then deep blue in color, while the nylon was reserved. A solution of C.I. Acid Red 85 was added. After dyeing at 100° for one hour longer, the nylon was bright scarlet, and the jute and rayon remained blue.

Example 36

Ten parts of loop pile carpeting consisting of three parts of jute backing and seven parts of a 50-50 mixture of Cumuloft and Deep-Dye nylon (products of the Chemstrand Corporation) monofilament fibers, was placed in a bath prepared from 0.1 part of the product of Example 1 and 0.035 part of tetrasodiumpyrophosphate in 200 parts of water. A solution of 0.1 part of C.I. Direct Red 83 in 50 parts of water was added and the bath heated to 100° in thirty minutes. Two parts of sodium chloride was added, and dyeing was continued at 100° for two hours. After rinsing and drying, both types of nylon remained undyed, while the jute backing was dyed bluish-red. A control dyeing performed simultaneously with no product of Example 1 present caused the Deep-Dye nylon to dye bluish-red of nearly the intensity of the jute backing. Also, the Cumuloft nylon was stained pink in this control dyeing.

Example 37

In Example 36, while otherwise proceeding as described, the C.I. Direct Red 83 was replaced with C.I. Direct Blue 80. In this example the two types of nylon were reserved also, while the jute was dyed a medium blue shade. The control dyeing in this example, with no reserve agent present (i.e., none of the product of Example 1), resulted in blue coloration of the jute backing and of the Deep-Dye nylon, while the Cumuloft nylon was stained a very pale blue.

Example 38

In Example 26, while otherwise proceeding as described, when the 0.1 part of the product of Example 1 was replaced by 0.1 part of any one of the products of Examples 2, 5, 8, 9, 10, 12, 13, 16, 17, 18, 19, 22, 23 or 24, the resultant dyeing was similar to that produced by Example 26.

I claim:

1. The method of reserving synthetic polyamide and polyurethane fibers to render them resistant to acid and to direct dyes which comprises applying to the fiber a water soluble sulfomethylated condensation product obtained from about 2 moles of a bis-phenol condensed with about 1 to 1.8 moles of formaldehyde first under alkaline conditions and then under acid conditions; and then the resulting product is reacted under alkaline conditions with sufficient formaldehyde-bisulfite adduct to introduce an average of from 1 to 2 sulfomethyl groups for each four benzene nuclei in the total structure, said bis-phenol having the structure:

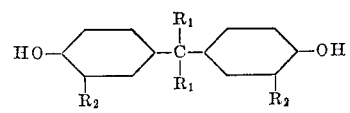

wherein $R_1$ represents the same or different low molecular weight alkyl groups and $R_2$ represents the same or different substituents selected from the group —H and —$CH_3$.

2. A process according to claim 1 wherein the bis-phenol is Bis-Phenol A.

3. A process according to claim 1 wherein the condensation product has the structure:

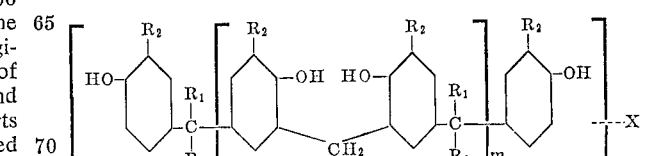

wherein
$R_1$ represents the same or different low molecular weight alkyl groups, $R_2$ represents the same or different substituents selected from the group —H and —CH$_3$, $m$ is an integer from 1 to 6 and X represents the substitution of an average of from 1 to 2 sulfomethyl groups for each four benzene nuclei in the total structure.

4. The process according to claim 1 wherein the textile also contains an animal hair fiber product.

5. The process according to claim 1 wherein the textile also contains a cellulosic fiber.

6. The process according to claim 1 wherein the condensation product is present in quantities of about ¼% to 4% of the weight of the textile.

References Cited
UNITED STATES PATENTS

| | | | |
|---|---|---|---|
| 2,522,569 | 9/1950 | Day et al. | 260—49 |
| 2,623,806 | 12/1952 | Fuchs et al. | 8—21 |
| 2,694,051 | 11/1954 | Black | 8—94.24 X |
| 2,931,694 | 4/1960 | Wirth et al. | 8—65 X |
| 2,953,597 | 9/1960 | Gedeon et al. | 8—94.24 X |
| 3,029,212 | 4/1962 | Lipowski et al. | 8—94.24 X |
| 3,065,039 | 11/1962 | Komarek et al. | 8—94.24 |

NORMAN G. TORCHIN, *Primary Examiner.*

J. CANNON, *Assistant Examiner.*